United States Patent [19]
Wallen

[11] Patent Number: 5,472,301
[45] Date of Patent: Dec. 5, 1995

[54] TRUCK CARGO LOCKING SYSTEM

[76] Inventor: Sammy K. Wallen, Box 491, Prestonsburg, Ky. 41653

[21] Appl. No.: 354,236

[22] Filed: Dec. 9, 1994

[51] Int. Cl.[6] .............................. B60P 7/15; B61D 45/00
[52] U.S. Cl. ............................................. 410/151; 410/143
[58] Field of Search ...................... 410/143, 145, 410/149, 151, 121; 248/354.1; 74/169; 254/12, 95, 108, 247

[56] References Cited

U.S. PATENT DOCUMENTS

| | | | |
|---|---|---|---|
| 923,463 | 6/1909 | Taylor | 410/151 |
| 2,411,768 | 11/1946 | Welch | 410/151 |
| 3,059,593 | 10/1962 | Mack | 410/151 |
| 3,841,660 | 10/1974 | Clark | 280/179 R |
| 3,995,565 | 12/1976 | Kersey | 410/151 |
| 4,023,819 | 5/1977 | Holman, Jr. | 410/151 |
| 4,174,119 | 11/1979 | Biles | 280/179 A |
| 4,434,970 | 3/1984 | Boland et al. | 254/108 |
| 4,607,991 | 8/1986 | Portor | 410/110 |
| 5,044,848 | 9/1991 | Burnham | 410/102 |
| 5,137,158 | 8/1992 | Brockway | 211/87 |
| 5,169,091 | 12/1992 | Beroth | 244/122 R |

FOREIGN PATENT DOCUMENTS

| | | | |
|---|---|---|---|
| 404745 | 12/1990 | European Pat. Off. | 410/143 |
| 2191800 | 12/1987 | United Kingdom | 410/151 |

*Primary Examiner*—Michael S. Huppert
*Assistant Examiner*—Stephen Gordon
*Attorney, Agent, or Firm*—John D. Gugliotta

[57] ABSTRACT

A truck cargo locking system that provides for cargo securement through the use of a device consisting of a spring loaded partitioning apparatus using slidable members and a specially adapted locking mechanism to provide rapid and optimal tension adjustments for installation. A pair of bracing plates buttress against the truck bed sides, and are surfaced with rubber padding each side to protect the vehicle surfaces. The bracing plates are tensioned with springs, and retaining pins maintain the integrity of the slidable parts while not in use. A locking device is pivotally affixed to one slidable member, and fixes the overall length of the sliding members by engaging between two detentes, or slightly angled, dulled teeth that appear in regularly spaced intervals along a row atop the other slidable member.

5 Claims, 4 Drawing Sheets

TRUCK CARGO LOCKING SYSTEM

FIELD OF THE INVENTION

This invention relates to a truck cargo locking system, and more specifically to an improved truck cargo locking system that can be utilized to secure otherwise shifting or shiftable loads carried in a pick-up truck bed or other vehicle cargo area without need to resort to ropes or other tie-down methods.

BACKGROUND OF THE INVENTION

Currently, pick-up trucks are an extremely common form of vehicular cargo transport. A problem arises, however, when a load being transported is too small or too unstable to safely or conveniently be transported without having to resort to some means of securing the load from either shifting or causing damage to either the load or the vehicle itself.

Many configurations and combinations have been devised to secure transported loads. In general, these devices or methods can be grouped into two categories: devices for cargo selective or cargo specific loads; and, devices affixed to preexisting or permanently added vehicle structures.

In U.S. Pat. No. 5,137,158 to Brockway, an article support apparatus is described wherein suction cups or magnets are utilized for attachment to a vehicle bed wall or trunk lid, and hooks or adjustable straps are utilized to attached to a selective load, namely those loads contained in bag or sack type enclosures. Additionally, the Brockway patent discloses "U" shaped notches to accommodate transporting of garments carried on clothes hangers.

In U.S. Pat. No. 5,169,091 to Beroth the invention comprises a track fastener apparatus and assembly, wherein a locking fastener is received by a fixed length of track, thereby providing a securement point for tieing down or similarly securing shiftable cargo. The preferred embodiment of the Beroth invention anticipates use with aircraft currently utilizing fixed lengths of track for receiving and securing passenger seating assemblies.

In U.S. Pat. No. 5,044,848 to Burnham the invention discloses a partition securement structure for a pick-up truck. In the Beroth invention, clips are affixed to fixed opening means thereby providing points to receive and secure a removable partition. Although the clips and partitions can be removable, the opening means themselves are fixed, and must be manufactured into the structure of the cargo bed or generated by penetrating the cargo bed walls after the vehicle has been manufactured.

In U.S. Pat. No. 4,607,991 to Porter the invention discloses an insertable and removable tie-down anchor for use with pick-up truck cargo beds. Designed to be received into a cavity intended to be used with a support post of a rack, these required cavities are commonly provided in the bed or side wall of a pickup truck. However, the Porter invention is dependent on both the existence and location of these support post cavities for the invention to be useful or effective, and can only secure a cargo if used in conjunction with rope or other similar tie-down means.

In U.S. Pat. No. 4,174,119 to Biles a device is disclosed that will secure pipes or other longitudinally elongated loads to a rack mounted on the bed of a pick-up truck. As in the Porter invention, not only is the Biles invention dependent on the existence of a support post cavity being provided with the vehicle, but also requires that vertical posts and horizontal rack members also be installed on the vehicle. Assuming these prerequisites are available, the Biles invention discloses a device that will secure one end of a tie-down rope by wedging it between a cam locking member and a vertical post, and will secure the other end of the tie-down rope, as well as provide the tension necessary to secure the load, via a jacking unit, also attached to said vertical post.

In U.S. Pat. No. 3,841,660 to Clark a pick-up truck rail assembly and die-down device is disclosed that essentially provides a device to attach to the upper edge of the side walls of the truck bed, thereby providing a continuous source of parallel tie-down points running the complete length of the truck bed.

BRIEF SUMMARY OF THE INVENTION

The general purpose of the current invention is to provide convenient, virtually immediate and very simple method of reliably containing cargo. Specifically, it is a general purpose of the current invention to provide a device that can be used to secure various cargo loads within a pick-up truck or cargo van bed without requiring the cargo load to be contained within a bag type enclosure or mounted on a clothes hanger type structure.

It is a further object of the current invention to provide a device that can be used to secure various cargo loads within a pick-up truck or cargo van bed without the use of magnets or suction cups to secure the device to the vehicle cargo bed.

It is a further object of the current invention to provide for load securing without the use of fixed lengths of track. More generally, an object of the current invention is to provide for securing loads without the necessity of devices or fixtures permanently attached to the cargo bed structure, and without penetrations or any opening means in the cargo bed structure or walls, and otherwise without damage to the truck bed or truck bed walls.

It is a further object of the current invention to provide for load securing means that can accommodate variable load sizes and be alternated or moved to various locations within the cargo bed.

It is a further object of the current invention to provide for a load securing means without requiring a rack or other preexisting mounting or carrying structure, and without occupying the rack support post cavity, and whose location is completely independent of the rack support post cavity location.

And, although ropes may also be utilized in conjunction with the current invention as a load securing means, it is yet another object of the current invention to provide for a load securing means without the general necessity of additional ropes or tie-down articles in order to adequately secure the load from shifting or horizontal movement during transport.

Finally, it is a further object of the current invention to provide for a load securing means that can accommodate various sized cargo beds, and can be easily locked, moved, or removed.

DETAILED DESCRIPTION OF THE PREFERRED EMBODIMENT

Figure 1:
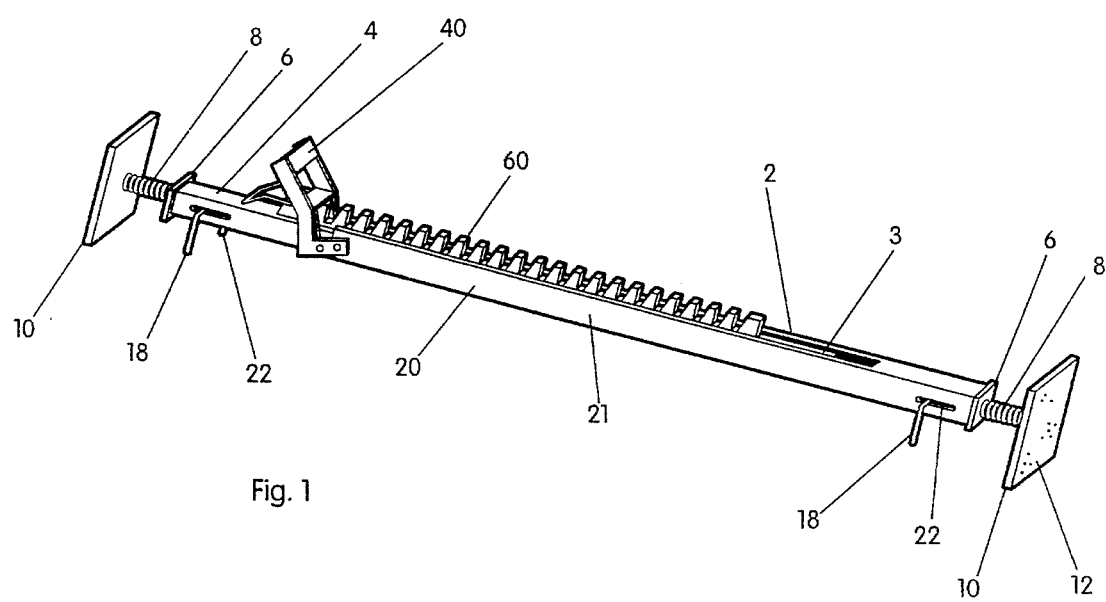
FIG. 1 is an isometric view of the invention.

FIG. 1 depicts an isometric view of the invention. As shown in FIG. 1, the invention comprises a slidable outer member 2 which encompasses and surrounds a telescoping inner member 4. The slidable outer member requires a pair of sidewalls 20, separated by a receiving slot 3, and connected by a bottom wall 21. In the preferred embodiment these members are normally constructed of aluminum or stainless steel tubing. However, although the figures depict a polygon shaped hollow tube, a variety of other materials and shapes may be utilized.

Figure 2:
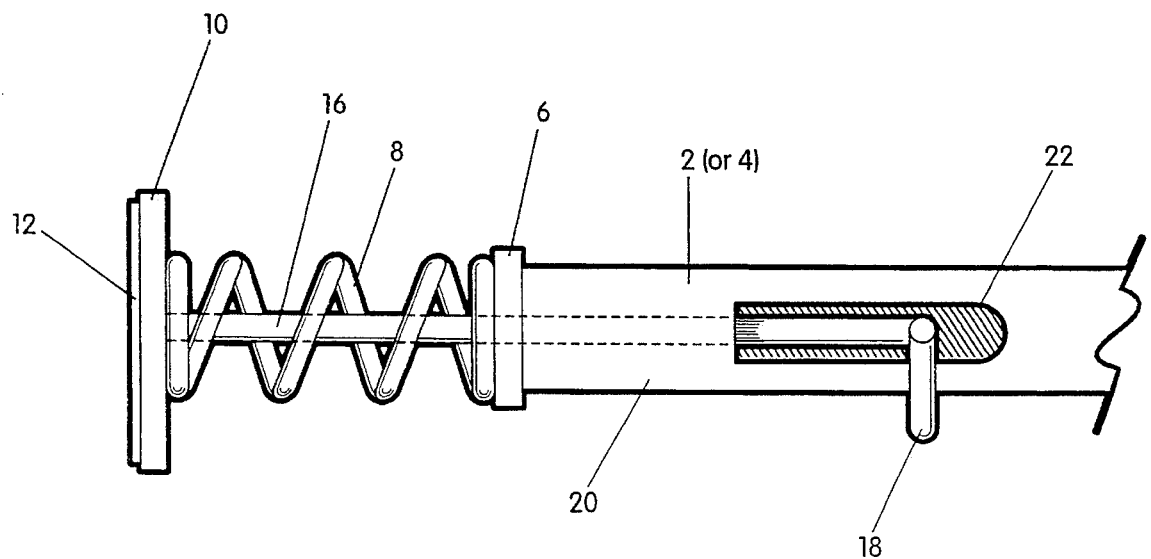
FIG. 2 is a cross sectional view of an end-plate unit composing each attachment end of the invention.
Figure 4:
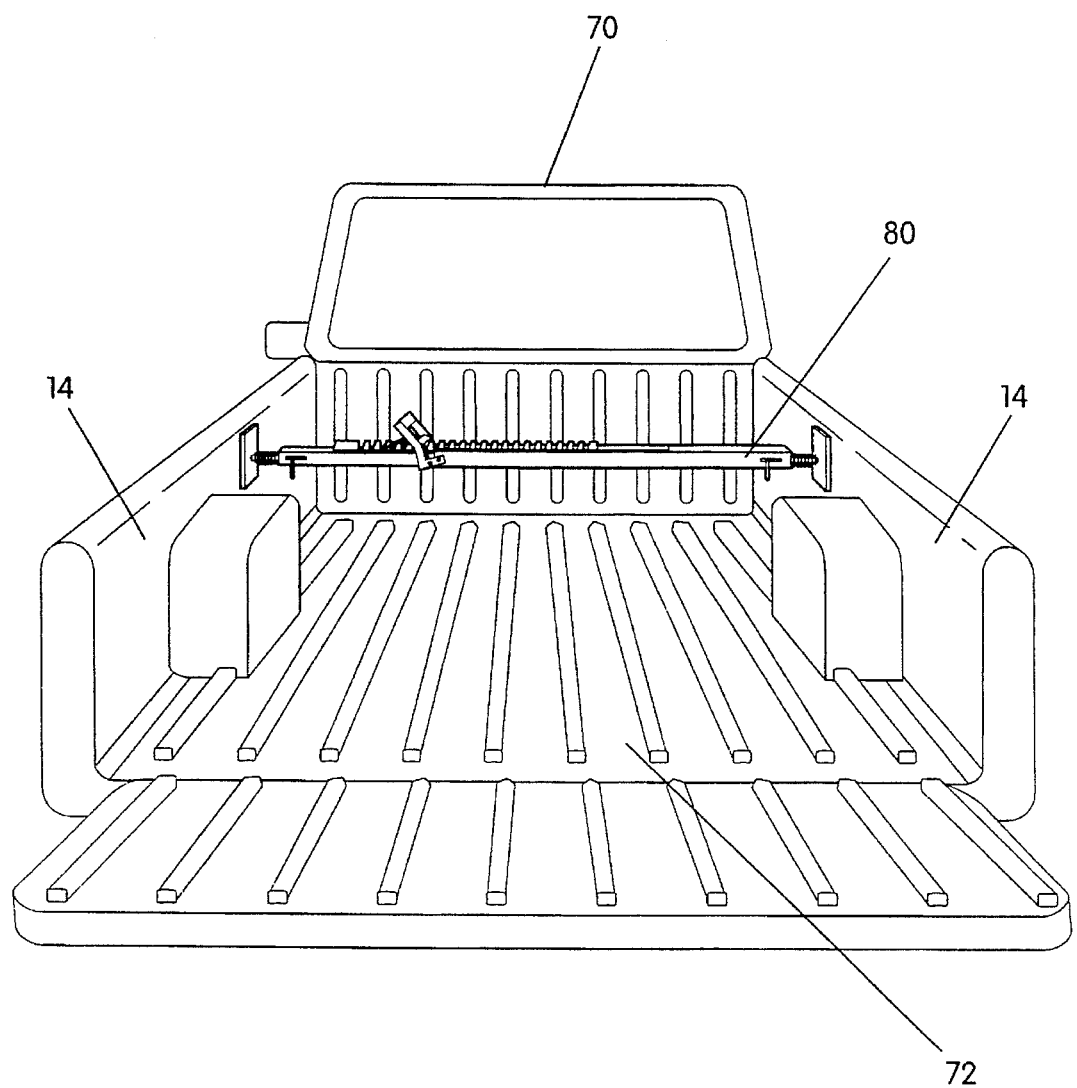
FIG. 4 illustrates the use of the invention in a typical application, specifically to provide a securing partition within the cargo bed of a pick-up truck.

As shown in both FIG. 1 and FIG. 2, the attachment end of the slidable outer member 2 is terminated in a flange 6. Said flange 6 is a contact point with spring 8, which provides tension between said flange 6 and bracing plate 10. The bracing plate 10 is preferably six inches by six inches square, but may of course vary with application. Said bracing plate 10 is also comprised of a padded surface 12, composed of foam rubber or other material that can provide a sufficient increase in friction while refraining from damaging the truck bed wall surface 14, as shown in FIG. 4. The details of FIG. 4 will be described further below.

Additional details of the attachment end of the slidable outer member is contained in both FIG. 1 and FIG. 2. Attached to the inner side of the bracing plate 10 is an axially, centrally mounted rod 16 which is surrounded by spring 8. The rod 16 passes freely through flange 6, and is adapted and dimensioned to accommodate the end of the slidable outer member 2, moving in and out depending upon the pressure imposed on the spring 8. Attaching the rod 16 to the slidable outer member 2 is a retaining pin 18, which is inserted through the rod 16 and passes through the sidewall 20 via a retaining pin slot 22 that penetrates the slidable outer member 2 without diminishing the structural integrity or strength of said slidable outer member.

Figure 3:
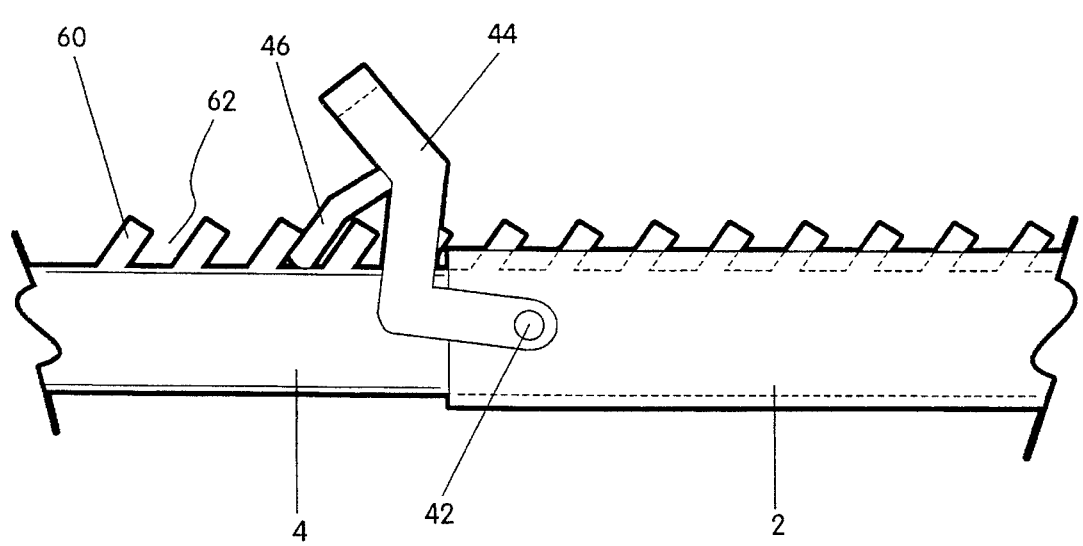
FIG. 3 is a cross sectional view of a locking device component of the invention.

In FIG. 1 and FIG. 3, the locking end of the slidable outer member is depicted. The locking end is located opposite of the attachment end described in FIG. 2. It is comprised of a locking device 40 which is pivotally attached to the slidable outer member 2 via a pivotal attachment means 42, wherein said pivotal attachment means does not interfere with the motion of the telescoping inner member 4 within and throughout the slidable outer member 2. The locking device consists of a handle-like lever 44 that can be used to push or pull the locking device 40 to engage or disengage the lock, as will be described below. Attached to the locking device 40 is also a locking brace 46. Said locking brace 46 must be sized appropriately to fit between the detentes 60 within the detente spaces 62 that are further described as part of the telescoping inner member.

The attachment end of the telescoping inner member is of similar design and construction as the attachment end of the slidable outer member. In reference to FIG. 1 and FIG. 2 and to summarize, the attachment end of the telescoping inner member 4 terminates in a flange 6, through which passes a rod 16, said rod being axially and centrally mounted to a bracing plate 10, on which is contained a padded surface 12. The rod 16 is encompassed and surrounded by a spring 8, which is contained between and has contact with the bracing plate 10 and the flange 6. Attaching the rod 16 to the telescoping inner member 4 is a retaining pin 18, which is inserted through the rod 16 and passes through the sidewall 20 through a retaining pin slot 22 that penetrates the telescoping inner member 4 without diminishing the structural integrity or strength of said telescoping inner member.

Although the attachment end of the slidable outer member and telescoping inner member are of similar design, construction, and functionality, the telescoping inner member end opposite the attachment end is very dissimilar to the locking end of the slidable outer member. As shown in both FIG. 1 and FIG. 3, the telescoping inner member 4 has integrated, exterior detentes 60, spaced evenly by detente spaces 62. These detentes 60 are to be engaged with the locking brace 46 when the locking device 40 is moved into the locked position. As the telescoping inner member 4 moves within the slidable outer member 2, the integrated, exterior detentes 60 pass freely and without obstruction into the receiving slot 3.

The entire invention is broadly denoted as number 80, and is shown in FIG. 4 illustrating a typical application. When used to secure a load in a pickup truck 70, the invention 80 is locked at a position where the inventions overall length is slightly larger than the width of the truck bed 72 at the point where cargo containment is required. By pushing a brace plate in, or by pulling a retaining pin (as described in FIG. 2) the invention can be situated between the truck bed sidewalls 14 in an appropriate location and with the appropriate tension to secure the cargo. In its preferred embodiment the invention 80 will measure less than the average width of a pick-up truck cargo bed, or approximately three feet in length between bracing plates when the invention is completely retracted and the telescoping inner member is at its innermost position. Also, in it's preferred embodiment the invention 80 will measure more than the average width of a pick-up truck cargo bed, or approximately five feet in length between bracing plates when the invention is completely extended and the sliding outer member is locked in the space between the last two detentes on the telescoping locking member.

While the preferred embodiments of the invention have been shown, illustrated, and described, it will be apparent to those skilled in this field that various modifications may be made in these embodiments without departing from the spirit of the present invention. For that reason, the scope of the invention is set forth in the following claims.

I claim:

1. A truck cargo locking system comprising:

two slidable members, comprised of an outer member and an inner member, each said member having an outer end and an inner end, said outer member containing a cavity to receive said inner member in a telescoping fashion, and said inner member having a plurality of linearly arrayed detentes;

two bracing plates, opposite each other, each said bracing plate having an attachment end and a connection end, with each said bracing plate in direct attachment at its connection end to each slidable member at the outer end of each said slidable member respectively;

tension means attached between each slidable member outer end and each respective bracing plate connection end for providing increasing resistance between said inner member and said outer member as said inner member is telescoped within said outer member; and a locking device for locking together said slidable members at a position fixed relative to each other comprising a locking brace pivotally attached to said outer slidable member for engagement between two consecutive linearly arrayed ones of said detentes of said inner slidable member.

2. A truck cargo locking system as set forth in claim 1, wherein said bracing plates are each movably attached at said connection end to said outer end of each said slidable members respectively via a rod that passes freely and centrally into said slidable members but is prevented from complete disengagement from said slidable members via a retaining means.

3. A truck cargo locking system comprising:

two slidable members, comprised of an outer member and an inner member, each said member having an outer end and an inner end, said outer member containing a cavity to receive said inner member in a telescoping fashion, and said inner member having a plurality of linearly arrayed detentes;

two bracing plates, opposite each other, each said bracing plate having an attachment end and a connection end, with each said bracing plate in direct attachment at its connection end to each slidable member respectively, wherein said bracing plates are each movably attached at each said connection end to said outer end of each said slidable member respectively via a rod that passes freely and centrally into said slidable members but is prevented from complete disengagement from said slidable members via a retaining means, and wherein said retaining means comprises a retaining pin attached to each said rod and passing through each respective slidable member via a retaining pin slot, each said retaining pin slot allowing movement of each said rod respectively without permitting complete disengagement or detachment of each said rod;

tension means for providing increasing resistance between said inner member and said outer member as said inner member is telescoped within said outer member; and a locking device for locking together said slidable members at a position fixed relative to each other comprising a locking brace pivotally attached to said outer slidable member for engagement between two consecutive linearly arrayed ones of said detentes of said inner slidable member.

4. A truck cargo locking system as set forth in claim 2, wherein each said bracing plate contains a padded surface on each said attachment end.

5. A truck cargo locking system as set forth in claim 1, wherein said tension means comprise at least one spring.

* * * * *